July 2, 1946.  T. R. SMITH  2,403,029
HIGH PRESSURE VALVE CONSTRUCTION
Filed Nov. 1, 1943  2 Sheets-Sheet 1

INVENTOR.
Thomas R. Smith
BY Parkinson & Lane
Attys.

Witness:
Chas. R. Koursh

July 2, 1946.　　　T. R. SMITH　　　2,403,029
HIGH PRESSURE VALVE CONSTRUCTION
Filed Nov. 1, 1943　　　2 Sheets-Sheet 2
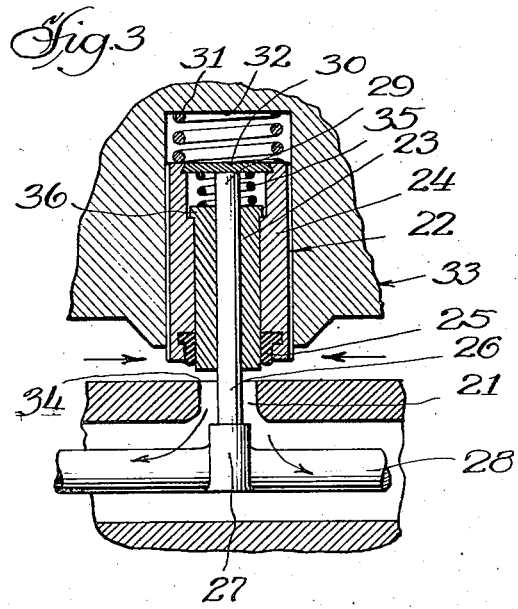
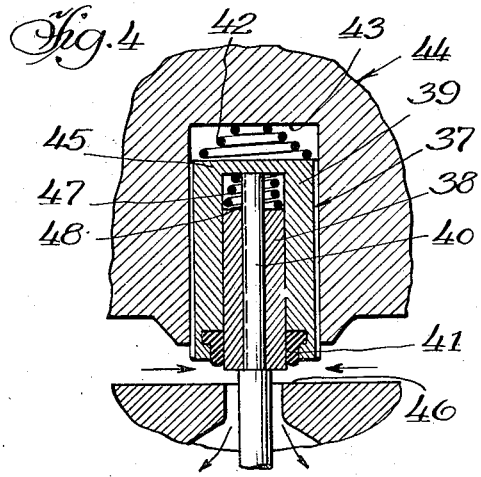
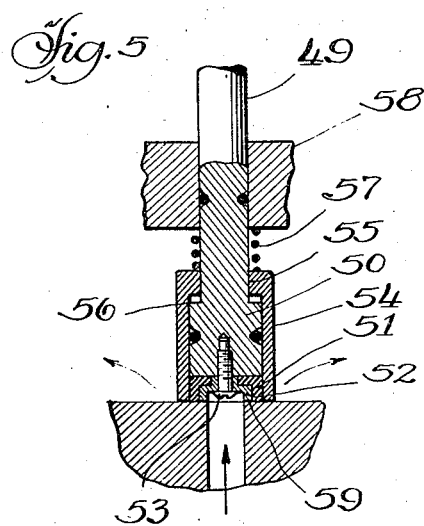
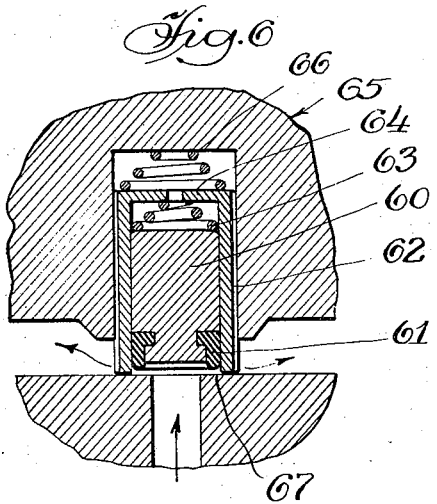
INVENTOR.
Thomas R. Smith
BY
Parkinson & Lane
Attys.
Witness:
Chas. R. Kourat.

Patented July 2, 1946

2,403,029

UNITED STATES PATENT OFFICE 2,403,029

HIGH-PRESSURE VALVE CONSTRUCTION

Thomas R. Smith, Newton, Iowa, assignor to The Maytag Company, Newton, Iowa, a corporation of Delaware Application November 1, 1943, Serial No. 508,515

3 Claims. (Cl. 251—159)

The present invention relates to a valve construction and especially to a novel valve and valve seat arrangement for use in high pressure hydraulic systems, and which novel construction and arrangement is applicable to various types of valves including relief valves, check valves, on and off valves, 4-way valves or any other type employing a poppet type valve seat.

The disclosed construction involves a novel principle of operation in which the valve includes a guard ring which drops down or is lowered into seating contact with the valve seat ahead of the seating of the sealing element when the valve is closed, and is retracted after the sealing element leaves the valve seat and thereby preventing extrusion of the resilient material of the seal through the opening between the valve and valve seat at the point of opening and closing, due to the high pressure of the hydraulic fluid in the system. Under normal pressure conditions as encountered in ordinary city water systems, such a guard ring is unnecessary because of the relatively low pressure of the fluid passing through the valve, but in hydraulic systems operating, for example, at approximately 1000 to 1500 pounds pressure, the material of the resilient sealing element must be protected against extrusion into the opening at the valve seat at the point of opening and closing.

In the present novel construction when the valve is moved to closed position, a metal guard ring drops down or is lowered onto the valve seat so as to substantially close the flow of fluid, after which the sealing element is lowered into seating and sealing engagement and thereby positively seals the seat.

A further object of the present invention is to provide a novel high pressure valve and valve seat construction so constructed and arranged that upon turning of the handle or other mechanism for closing the valve, a metal guard ring is automatically moved into engagement with the valve seat, after which a resilient sealing element is moved into sealing engagement with the seat for positively closing the valve and completely stopping all passage of fluid regardless of the pressure at which the hydraulic system is operating.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawings, and while there is shown therein a preferred embodiment, it is to be understood that the same is susceptible of modification and change, and comprehends other details, arrangements of parts, features and constructions without departing from the spirit of the invention.

In the drawings:

Figures 3 and 4 are views similar to Figure 2 but showing alternate forms of valve and valve seat assemblies, with the higher pressure above the seat and the valves shown in open position.

Figure 5 is a fragmentary view in vertical cross section of a further alternate form of high pressure valve and valve seat assembly in which the higher pressure is below the seat, the valve being shown in closed position.

Figure 6 is a fragmentary view in vertical cross section showing a valve seat similar to that provided in Figure 5, but showing an alternate or modified construction of valve assembly, the parts being shown just prior to seating of the sealing element.

Figure 1:
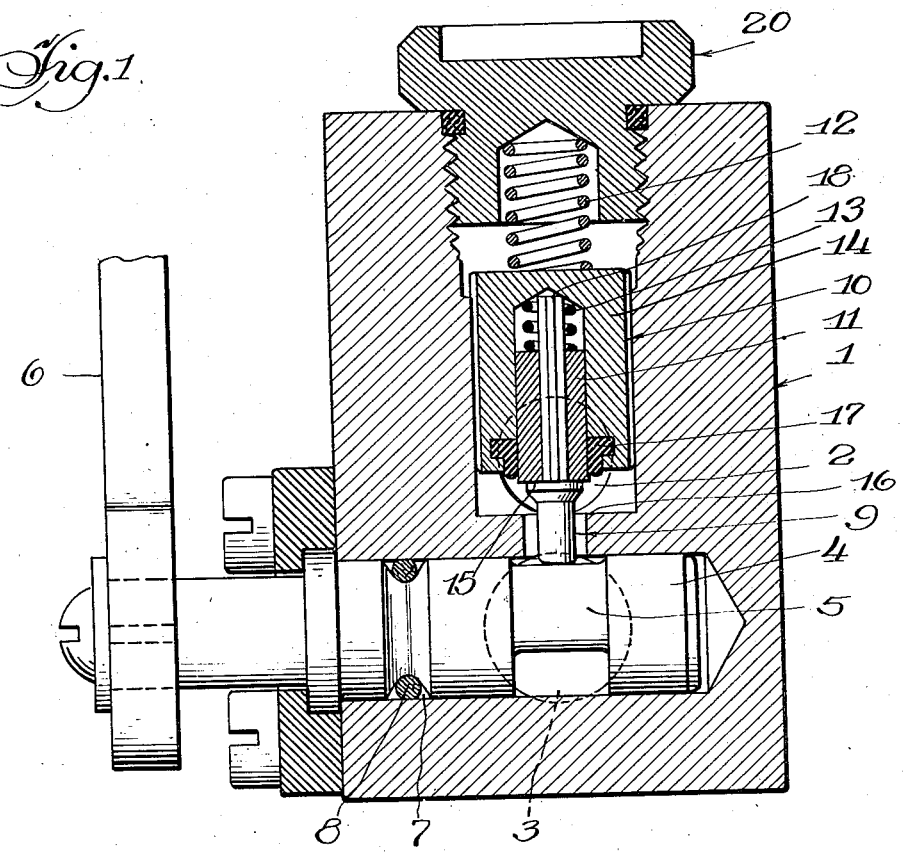
Figure 1 is an enlarged view in vertical cross section through the novel valve and valve seat construction and arrangement with the valve shown in open position.
Figure 2:
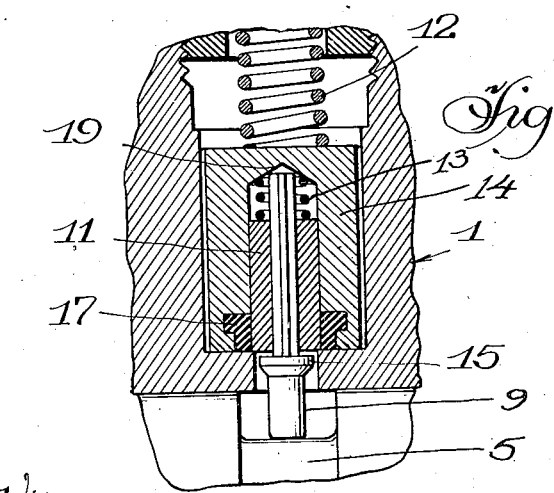
Figure 2 is a fragmentary view similar to Figure 1 but showing the valve and seat in closed relation.
Figure 2A:
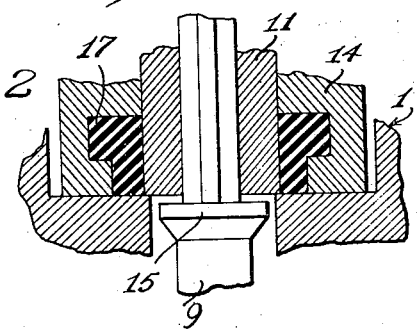
Figure 2A is a fragmentary enlarged view showing the position of the valve including the sealing ring and lip when in closed position.

Referring more particularly to the disclosure in Figures 1 and 2 of the drawings, the novel embodiment therein selected to illustrate the invention comprises a valve and valve seat assembly in which the valve includes a body 1 having an inlet 2 and outlet 3 for the hydraulic fluid. This valve is provided with a rotatable cam shaft 4 having a cam or eccentric portion 5 and to which shaft is connected a handle 6 adapted to be operated manually or through any suitable mechanism for actuating the valve. In order to seal the cam shaft against leakage, this shaft is provided with a substantially V-shaped groove 7 carrying a resilient sealing ring 8 having a sealing and wiping contact with the adjacent surface of the body portion 1.

In Figure 1 the valve is shown in open position in which the cam or eccentric portion 5 on the shaft 4 is in elevated position for raising a push pin 9 to thereby elevate the valve assembly 10 including the inner plunger or metal guard ring 11. When the handle 6 is turned to rotate the cam shaft 4 to the position shown in Figure 2, the push pin 9 is permitted to drop down under the pressure of the spring 12. A spring 13 within the plunger 14 holds the inner plunger or guard ring 11 down against the shoulder 15 on the push pin 9, and as the valve assembly is lowered, this inner plunger or guard 11 is first to engage the valve seat 16 to thereby substantially block off the flow of fluid from the inlet 2 to the outlet 3. This contact of the inner plunger or guard ring 11 upon the valve seat 16 closes off any clearance space which would permit extrusion of the material of the resilient sealing element 17 between the valve and valve seat due to the high pressure of the hydraulic fluid seeking to escape. Following this initial seating of the guard ring 11, as the cam continues to rotate, the shoulder 15 on the push pin 9 withdraws from engagement with the lower edge of the inner plunger or guard ring 11 and allows the guide plunger 14 to drop down under continued pressure from the spring 12 seating against its upper surface. This guide plunger 14 carries the sealing element 17 which is adapted to be forced down into contact with the valve seat and thereby forming a positive seal against leakage of the hydraulic fluid. The relation of these parts in closed position is clearly shown in Figure 2.

If rotation of the cam shaft is continued or reversed from that shown in Figure 2, the push pin 9 is forced upwardly, and in this upward movement its upper end 18 first contacts the under surface 19 of the guide plunger 14 carrying with it the sealing element 17 and thereby raising the sealing element from its contact with the valve seat. Next the shoulder 15 on the push pin 9 contacts the inner plunger or guard 11 and lifts it from the valve seat so as to allow full fluid flow. A bleeder plug 20 permits access to the valve assembly 10 and provides for adjustment of the compression on the spring 12.

Figure 3 discloses an alternate construction in which the pressure is above the seat and the hydraulic fluid is discharged through the outlet 21. In this construction the valve assembly 22 includes an inner plunger or guard ring 23 and an outer plunger or guide 24 carrying a resilient sealing ring 25 at its lower end. Within the inner plunger or guard ring 23 is loosely and slidably mounted a push pin 26 resting upon and adapted to be raised by a projecting surface 27 on a cam shaft 28 rotated by any suitable means. The upper end 29 of this push pin seats or impinges against the under surface of a plate 30 carried in the upper end of the guide plunger 24. A spring 31 seating between and bearing against this upper end and the surface 32 in the body 33 of the valve assembly, tends to force the assembly down into sealing contact with the valve seat 34. A spring 35 seating between the under side of this plate and the upper shouldered end 36 of the inner plunger or guide ring 23, tends to force the lower end of this guide ring into abutting contact with the seat 34.

In the operation thereof and assuming the valve to be closed, when the cam shaft 28 is rotated to open the valve, the initial upward movement of the push pin 26 carries the outer plunger or guide 24 upwardly and the sealing element 25 out of contact with the valve seat 34. Further movement brings the internal shoulder on this outer plunger into contact with the shouldered end 36 on the inner plunger or guard ring 23 and raises this ring out of engagement with the seat 34. When the cam shaft is moved to release the push pin, it drops down and the springs 31 and 35 force first the guard ring 23 into contact with the seat 36, and then the outer plunger 24 is depressed to cause the sealing element 25 to positively seal off the outlet 21.

In Figure 4 is shown a valve assembly 37 very similar in construction and operation to that shown in Figure 3, and including an inner plunger or guard ring 38, an outer plunger or guide 39 and a push pin 40 adapted to be raised by suitable actuating mechanism such as the projecting surface 27 on cam shaft 28 of Figure 3. The outer plunger or guide 39 carries a sealing ring 41 at its lower end. A spring 42 positioned between the surface 43 of the valve body 44 and the upper end 45 of the outer plunger 39, tends to force the valve assembly downwardly into seating engagement with the valve seat 46, while a spring 47 located between this upper end 45 and the upper annular surface 48 of the inner plunger or guard ring 38, tends to force this ring downwardly into contact with the valve seat 46.

In Figure 5 is shown an alternate construction of valve assembly including a valve stem 49 having its lower end enlarged to form a head or piston 50 carrying a sealing element 51 detachably secured thereto by suitable means such as a washer 52 and bolt 53. Encompassing this head or piston 50 is a guard ring or sleeve 54 having a reduced flange 55 adapted to be engaged by the shoulder 56 on the head when the stem is raised to open the valve. A spring 57 surrounds the stem with one end seating against the under side of a stationary housing or valve body 58 and its lower end seating against the upper surface of the flange 55, for forcing the guard ring or sleeve 54 into contact with the valve seat 59. Sealing rings are provided on the head and stem for preventing leakage between the head and guard ring and between the stem and housing, respectively.

Figure 6 discloses a high pressure relief valve assembly including a slidable member 60 carrying a sealing element 61 and a concentric sleeve or guard ring 62. A spring 63 is positioned between the member 60 and the top 64 of the guard ring 62, and between this guard ring and the valve body 65 is positioned a spring 66, these springs being so arranged and related that in opening of the valve, member 60 carrying the sealing element or ring 61 is first moved out of seating engagement with the valve seat 67, after which the guard ring 62 is forced upwardly from its contacting engagement with the seat. In closing, the guard ring 62 seats first, and thereafter the sealing ring is lowered into sealing engagement.

In each of the disclosed embodiments of the invention, a guard ring is lowered into contact with the valve seat ahead of the contact of the resilient sealing element, and this guard ring remains in contact with the seat until after the sealing element is raised from its seating engagement so as to eliminate any possibility of extrusion of the sealing element into the opening between the valve stem and valve seat. The sealing element may be of any suitable material, including natural or compounded synthetic rubber, or other rubber-like material.

One distinct advantage of the present invention is that it is not necessary to have a finely lapped and polished seat to prevent leakage. Any ordinary machined surface is satisfactory inasmuch as the actual sealing is obtained by means of the rubber-like sealing element which is self-sealing in its nature. This makes it possible to use a flexible type sealing element in high pressure valves, thereby assuring a positive seal. By the use of the flexible sealing element and the fact that it extends below the metal of the member by which it is carried and thereby contacts the valve seat ahead of any actual metal contact of its carrying member with the valve seat, it is possible to obtain perfect sealing even though the metal parts are held a slight distance apart due to dirt or other foreign particles therebetween.

Having thus disclosed the invention, I claim:

1. In a high pressure valve and flat seat construction, a valve comprising a pair of relatively movable concentric members each adapted to be moved into seating contact with the valve seat, a recess in the seating face of one of the members and a resilient sealing element securely anchored in said recess having its lower end projecting therebeyond for sealing contact with the seat, said recess being of such dimensions as to accommodate the entire mass of said sealing element when said member is in sealing contact with the seat, said members being so constructed and arranged that when the valve is opened, the member carrying the sealing element is moved and raises the sealing element out of seating contact with the valve seat prior to the other member, and when the valve is closed is moved into sealing contact after the other member has been seated.

2. In a high pressure valve and flat seat construction, a valve comprising a pair of relatively movable concentric members each adapted to be moved into seating contact with the valve seat, an annular channel formed in between and by said members and a resilient sealing element located in said channel and securely anchored to one of said members and having its lower end projecting therebeyond for sealing contact with the seat, said channel being of such dimensions as to accommodate the mass of said sealing element when both members are in sealing contact with the seat, said members being so constructed and arranged that when the valve is opened, the member carrying the sealing element is moved and raises the sealing element out of seating contact with the valve seat prior to the other member, and when the valve is closed is moved into sealing contact after the other member has been seated.

3. In a high pressure valve and flat seat construction, a valve comprising a pair of relatively movable concentric members each adapted to be moved into seating contact with the valve seat, an annular recess formed in between and by said members and a resilient sealing element located in said recess and securely anchored to one of said members and having its lower end projecting therebeyond for sealing contact with the seat, said recess being of such dimensions as to accommodate the mass of said sealing element when both members are in sealing contact with the seat, said members being so constructed and arranged that when the valve is opened, the member carrying the sealing element is moved and raises the sealing element out of seating contact with the valve seat prior to the other member, and when the valve is closed is moved into sealing contact after the other member has been seated, the valve construction being so arranged that the member to which the sealing element is anchored is adjacent to the high pressure side of the valve and the other member adjacent to the low pressure side of the valve.

THOMAS R. SMITH.